Patented Apr. 24, 1951

2,550,196

UNITED STATES PATENT OFFICE 2,550,196

COMPOSITE SOLID CARBON DIOXIDE

Charles L. Jones, New York, N. Y., assignor to International Carbonic Engineering Company, Wilmington, Del., a corporation of Delaware No Drawing. Original application October 11, 1944, Serial No. 558,216. Divided and this application May 12, 1947, Serial No. 745,587

1 Claim. (Cl. 252—67)

This application is filed as a division of my copending parent application filed October 11, 1944, Serial No. 558,216, now Patent No. 2,464,089, for Composite Solid Carbon Dioxide and Methods and Apparatus for Producing the Same.

This invention relates to certain improvements in composite solid carbon dioxide; and the nature and objects of the invention will be readily recognized and understood by those skilled in the art, in the light of the following explanation and description of the nature and characteristics of a composite solid carbon dioxide of my invention, and of certain specific examples of such composite solid carbon dioxide, from among other examples and forms of composite solid carbon dioxide of my invention included within the broad spirit and scope thereof.

My present invention is concerned with composite solid carbon dioxide, that is, solid carbon dioxide to which another ingredient or substance or ingredients or substances has or have been added for the purpose of modifying or changing the physical and structural characteristics and/or the refrigerating effect of the solid carbon dioxide in the composite mass.

Solid carbon dioxide in block or cake form has been known and extensively used as a refrigerant for a number of years. It is also known and recognized that the refrigerating effect of solid carbon dioxide can be modified by hydrating the solid carbon dioxide by the addition of water in such a manner as to produce a hydrated composite carbon dioxide containing water ice particles. When a block or cake of such hydrated composite solid carbon dioxide sublimes or evaporates, an insulating blanket which includes a mass of water ice particles, develops and remains over and covering the mass or block of carbon dioxide, and such "blanket," because of its heat insulating characteristics, functions to regulate the refrigerating effect and to retard the rate of sublimation or evaporation and prolong the life of the mass of hydrated composite carbon dioxide. Such a hydrated composite carbon dioxide and a method of producing it, is set forth and disclosed in the U. S. patent to Josephson, 1,927,175, dated September 19, 1933, in which the composite solid carbon dioxide contains a relatively small percentage of solely water without other ingredients or substances, in the form of water ice crystals for the primary purpose of providing a saturated vapor to inhibit the tendency of carbon dioxide to pick up and deposit moisture from its surroundings.

In the U. S. Patent No. 2,020,189, dated November 5, 1935, I have disclosed the addition of certain characters of substances to solid carbon dioxide. The specified substances in accordance with the aforesaid patent are added in relatively small quantities or percentages to a mass of solid carbon dioxide prior to the compressing of such mass with the added substances into a dense block or cake. Such substances are added primarily to function as a plasticizer to improve the characteristics and behavior of the mass of solid carbon dioxide under pressing, as well as to improve the physical structure of the completed dense block or cake pressed from the mass. Due to the small percentages of the added substances, in accordance with the disclosures of the aforesaid patent, the refrigerating effect of the evaporation or sublimation of the solid carbon dioxide of which the block or cake is composed, is not substantially affected or controlled.

My invention is especially concerned with the provision of composite solid carbon dioxides of the broad hydrated type exemplified by the addition of water in the form of water crystals or particles to form the composite mass; and one of the primary objects of my invention is to provide such a hydrated type of composite carbon dioxide formed of solid carbon dioxide and a substantial percentage of an addition agent or agents having such physical characteristics as to produce under the conditions established by the evaporation or sublimation of the solid carbon dioxide of which the mass is composed, a coherent skeletally continuous insulating blanket of frozen particles on and completely covering and enclosing the mass of the composite carbon dioxide, for the purpose of modifying and controlling the refrigerating effect of the subliming carbon dioxide.

A more specific object of the invention is to provide a composite carbon dioxide of the general hydrated class, comprised of solid carbon dioxide and fine particles or crystals of a water solution of an organic chemical of a character which will not be objectionable as a residue, and which solution will have a freezing point lower than the freezing point of water but higher than that of carbon dioxide.

Another general object of the invention is to provide composite solid carbon dioxides comprised of a reactant agent and solid carbon dioxide, which composite may be particularly used in organic synthesis by placing the composite solid mass directly in the acid to effect the reaction while the solid carbon dioxide automatically controls the reaction temperature.

Another object of the invention is to provide a type of composite solid carbon dioxide for the handling and application of volatile toxic or odorous substances having a low vapor pressure at the temperature of the solid carbon dioxide, such composite solid carbon dioxide being comprised of a substantial proportion of the volatile toxic or odorous substance solidified with or in solidified state in the solid carbon dioxide.

As an example of a composite solid carbon dioxide of my invention of the hydrated type, particularly adapted for use as a refrigerant, the composite solid carbon dioxide is comprised of a water solution of an organic chemical or substance which is insoluble in liquid carbon dioxide, such as methanol or ethanol, in which the water solution contains approximately five to ten percent (5% to 10%) of the methanol or ethanol, in the form of fine crystals or frozen particles of the water solution uniformly distributed through the mass of solid carbon dioxide and preferably compressed into dense block or cake form. The water solution of the above example which contains approximately five to ten percent (5% to 10%) of the organic chemical, methanol or ethanol, has a freezing temperature of the approximate order of twenty-five degrees Fahrenheit (25° F.) or lower, but still has a higher freezing point than the freezing point of carbon dioxide.

The quantity of such water solution containing the organic chemical, such as the methanol or ethanol, will be such as to produce a quantity of the frozen crystals or particles of the solution which are distributed through the composite mass and constitute approximately five to twenty percent (5% to 20%) of the mass of composite solid carbon dioxide. However, the specific percentage of the frozen water solution added to a mass of solid carbon dioxide to form a particular composite carbon dioxide of this type of my invention, is primarily determined by the extent or degree of the change or control of the refrigerating effect which it is desired to obtain from the sublimation of the solid carbon dioxide in the composite mass or block. By varying the percentage or relative proportion of frozen water solution to the solid carbon dioxide in a given mass of the composite, the "weight," that is the depth and density of the "snow blanket" or enveloping mass of the frozen particles of the water solution, which will be developed and maintained over and surrounding the subliming solid carbon dioxide in the mass or block of composite carbon dioxide, may be determined.

Where such composite solid carbon dioxide is utilized as a refrigerant, such organic chemicals as methanol or ethanol are of such a character as to leave no objectionable residue on sublimation of the composite carbon dioxide. It is within the intent and recognition of my invention that various other organic chemicals or substances which are insoluble in liquid carbon dioxide may be employed in forming this type of "hydrated" composite solid carbon dioxide of the invention, in water solutions thereof which will have a freezing point or temperature higher than the freezing point of carbon dioxide but lower than the freezing point of water, say of the order of approximately twenty-five degrees Fahrenheit (25° F.) or lower. No claim is made herein specifically to methanol as the organic component of the composite, as such specific claim is presented in my co-pending application, Serial No. 178,173 for Composite Solid Dioxide, filed August 7, 1950, as a division of this parent application, Serial No. 747,587.

Another form of composite solid carbon dioxide of my invention, which is particularly useful in organic synthesis, is formed of a mass of solid carbon dioxide containing a reactant which has been added thereto to form the composite mass, such composite mass being then preferably compressed into dense block or cake form. Such a block or cake of this type of composite can then be placed directly in a suitable agent such as an acid with the low temperature of and maintained by the composite block acting to automatically control the temperature during the reaction. As an example of the foregoing type of composite solid carbon dioxide, I provide a composite comprised of vegetable oil or oils added to the solid carbon dioxide in substantial proportion, with the composite mass preferably compressed into dense cake or block form for ease of storage and handling. Such a composite carbon dioxide may then be placed directly in the sulphanating acid so that sulphanation at an automatically controlled low temperature results. Similarly other organic composites may be made for other low temperature reactions than sulphanation, and with other reactants than vegetable oils. Composite solid carbon dioxide of this type of my invention are essentially characterized by the fact that they provide a reactive mixture consisting of the reactant and the cooling agent so that the cooling agent will simultaneously and automatically function to keep down the reactive temperature during the reaction.

My invention also contemplates and includes composite solid carbon dioxide for use in the transportation of dangerous or toxic materials, such as posion gases for use in warfare. And examples of such composite carbon dioxide are typified by the fact that a volatile toxic or odorous substance having a low vapor pressure at the temperature of solid carbon dioxide is mixed with or added to a mass of solid carbon dioxide in the required relative proportions for the particular use to which the composite is to be put, but preferably as a substantial proportion or percentage of the composite, with the composite mass compressed into dense block or cake form. In this manner, volatile toxic substances may be transported and handled cheaply and efficiently and with relative safety.

The invention also includes and provides composite solid carbon dioxides made up of mixtures of solid carbon dioxide and various substances useful in the fumigation of soils and commodities, such substances being released upon sublimation and evaporation of the solid carbon dioxide content of the composite.

What I claim is:

As an article of manufacture, a composite comprised of; a dense block or cake of solid carbon dioxide, and from approximately five to twenty percent (5 to 20%) of a frozen water solution of approximately five to ten percent (5 to 10%) of ethanol, said frozen water solution being in the form of frozen particles substantially uniformly distributed throughout the block or cake of solid carbon dioxide whereby as the carbon dioxide sublimes there is formed and maintained a substantially coherent skeletally continuous blanket of frozen particles of water solution substantially enclosing the composite.

CHARLES L. JONES.

REFERENCES CITED

The following references are of record in the file of this patent:

UNITED STATES PATENTS

| Number | Name | Date |
|---|---|---|
| 1,844,522 | Oster | Feb. 9, 1932 |
| 1,927,175 | Josephson | Sept. 19, 1933 |
| 2,007,510 | Thornton | July 9, 1935 |
| 2,020,189 | Jones | Nov. 5, 1935 |
| 2,024,027 | Cotton et al. | Dec. 10, 1935 |
| 2,187,388 | Williams | Jan. 16, 1940 |
| 2,342,991 | Wikoff | Feb. 29, 1944 |